US008117245B2

(12) United States Patent
DelGaudio et al.

(10) Patent No.: US 8,117,245 B2
(45) Date of Patent: *Feb. 14, 2012

(54) SYSTEM AND METHOD FOR USING DEMOGRAPHIC ORGANIZATION AND SEGMENTATION TO MANAGE LARGE SCALE PROJECTS

(75) Inventors: Carol DelGaudio, Williston, VT (US); Scott D. Hicks, Underhill Center, VT (US); James A. Martin, Jr., Endicott, NY (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 658 days.

This patent is subject to a terminal disclaimer.

(21) Appl. No.: 10/940,461

(22) Filed: Sep. 14, 2004

(65) Prior Publication Data

US 2006/0069693 A1 Mar. 30, 2006

(51) Int. Cl.
*G06F 17/30* (2006.01)
(52) U.S. Cl. ...................................................... 707/829
(58) Field of Classification Search .................. 707/3, 4, 707/9, 101, 104, 1, 769, 829, 999.001, 200 S; 705/50
See application file for complete search history.

(56) References Cited

U.S. PATENT DOCUMENTS

| | | | | |
|---|---|---|---|---|
| 5,832,485 A * | 11/1998 | Chaudhry | ......................... | 707/9 |
| 6,272,468 B1 | 8/2001 | Melrose | | |
| 6,493,717 B1 * | 12/2002 | Junkin | .......................... | 707/102 |
| 6,748,393 B1 * | 6/2004 | Kapoor et al. | ................. | 707/102 |
| 2003/0033402 A1 * | 2/2003 | Battat et al. | .................... | 709/224 |
| 2003/0055697 A1 * | 3/2003 | Macken et al. | ..................... | 705/7 |
| 2003/0065681 A1 * | 4/2003 | Houston et al. | ............... | 707/200 |
| 2003/0120372 A1 * | 6/2003 | Ruth et al. | ..................... | 700/108 |
| 2003/0151633 A1 * | 8/2003 | George et al. | ................. | 345/864 |
| 2003/0208589 A1 | 11/2003 | Yamamoto | | |
| 2004/0039755 A1 * | 2/2004 | Kunze | ........................ | 707/104.1 |
| 2004/0098306 A1 * | 5/2004 | Fitzpatrick et al. | ............. | 705/14 |
| 2004/0113937 A1 * | 6/2004 | Sawdey et al. | ................. | 345/738 |
| 2004/0177310 A1 * | 9/2004 | Mohan et al. | .................. | 714/776 |
| 2005/0027757 A1 * | 2/2005 | Kiessig et al. | ................. | 707/204 |
| 2005/0125522 A1 * | 6/2005 | DelGaudio et al. | ........... | 709/223 |

OTHER PUBLICATIONS

Dan Cosley, et al., "Studying the Effect of Similarity in Online Task-Focused Interactions", Group '03, Nov. 9-12, 2003, pp. 321-329.

(Continued)

*Primary Examiner* — Kimberly Lovel
(74) *Attorney, Agent, or Firm* — Anna L. Linne; Roberts Mlotkowski Safran & Cole, P.C.

(57) ABSTRACT

A method and system is provided to demographically represent and implement one or more projects associated with an entity such as a corporation in a database so that the views into the database reflect a defined hierarchy of the demographics of the project or entity. The views may be created to reflect various aspects such as technological components, physical attributes of the entity, processes, or other attributes. The processes reflected by the views may also provide action based data elements for supporting the activities necessary to accomplish the processes over time. The project and associate views may also be organized by language or geographic requirements. In use, the invention may provide for management and control for large scale projects such as a migration from one organizational state to another.

19 Claims, 13 Drawing Sheets

OTHER PUBLICATIONS

Karen Pettigrew, et al., "Public Use of Digital Community Information Systems: Findings from a Recent Study with Implications for System Design", JCDL '01, Jun. 24-28, 2001, pp. 136-143.
Patel, VL, et al., "Clinical Benchmarking Enabled by the Digital Health Record", Medinfo 2001, Proceedings of the $10^{th}$ World Congress on Medical Informatics, Pt. vol. 1, pp. 675-679.

Office Action dated Jan. 24, 2011 in U.S. Appl. No. 11/847,027.
Office Action dated Aug. 9, 2010 in U.S. Appl. No. 11/847,027.
Final Office Action dated Apr. 16, 2009 in U.S. Appl. No. 11/847,027.
Office Action dated Oct. 31, 2008 in U.S. Appl. No. 11/847,027.

* cited by examiner

FIGURE 3

SYSTEM AND METHOD FOR USING DEMOGRAPHIC ORGANIZATION AND SEGMENTATION TO MANAGE LARGE SCALE PROJECTS

FIELD OF THE INVENTION

The invention generally relates to demographic organization and segregation of information and, more specifically, to demographic organization and segregation of information in databases to achieve logical segmentation of large scale projects.

BACKGROUND DESCRIPTION

In very large organizations such as large corporations or governmental entities, management of infrastructure components may become overwhelming. For example, these components may comprise computers, networks, types of connectivity, specific types of technologies, versions of components, telecommunication devices, or any other components that typically has evolutionary characteristics or interoperability requirements.

When an organization or enterprise undergoes a large scale migration, efficiently administering or coordinating the migration activity may become unachievable or, at least, a great challenge. The migration may include such notions as physical relocation of large numbers of people and equipment to different locations, functional reorganization of personnel, or general upgrade in a variety of technologies, or the like. If the migration is very large in scope, scheduling and costs may become prohibitive, or at least demand closely monitored controls.

If a large scale migration includes physical reorganization of offices and personnel simultaneously with general technology upgrades such as computers, phone systems, equipment, local area networks (LANs), the challenge is compounded. Tracking physical specifications such as office wiring and/or connectivity locations and correlating these physical parameters to personnel requirements and their associated equipment such as computer types, versions of software or types of connectors to networks, becomes a very complicated matter.

Typically, a migration group or other designated group, such as an information technology (IT) group, may be charged with overall management and facilitation of a migration. However, developing the parameters of the migration and then organizing the parameters associated with all the components, people, and physical space typically is not well defined in a manner suited for the task. The amount of data that may be required to describe, anticipate and control a migration for the long term may even exceed the realistic limits of common databases, in particular, from a database performance point of view.

SUMMARY OF THE INVENTION

In an aspect of the invention, a method is provided for segmenting a migration project. The method comprises arranging data views demographically to reflect one or more characteristics of an entity, instantiating the data views and accessing the data views to add, modify or view demographically arranged data reflective of one or more characteristics of the entity to manage the demographically arranged data to effect a change in the one more characteristics of the entity.

In another aspect of the invention, a method for segmenting an enterprise activity is provided. The method comprises defining at least one process associated with a project, defining a view hierarchy and list of views reflective of the at least one process and creating one or more database instances implementing the view hierarchy to manage data associated with implementation of the at least one process associated with the project.

In another aspect of the invention, a system to segment a migration project is provided. The method comprises a means for arranging data views demographically to reflect one or more characteristics of an entity, a means for instantiating the data views and a means for accessing the data views to add, modify or view demographically arranged data reflective of one or more characteristics of the entity to manage the demographically arranged data to effect a change in the one more characteristics of the entity.

In another aspect of the invention, a computer program product is provided comprising a computer usable medium having readable program code embodied in the medium, the computer program product includes at least one component to arrange data views demographically to reflect one or more characteristics of an entity, instantiate the data views and access the data views to add, modify or view demographically arranged data reflective of one or more characteristics of the entity to manage the demographically arranged data to effect a change in the one more characteristics of the entity.

BRIEF DESCRIPTION OF THE DRAWINGS

FIG. 3 is an embodiment of a graphical user interface (GUI) showing demographically organized views, according to the invention;

DETAILED DESCRIPTION OF EMBODIMENTS OF THE INVENTION

This invention is directed to a system and method for providing views into a database(s) so that the views may be categorized and grouped based on demographics. The views or series of views and/or subviews may be logically grouped to reflect a common aspect of the data within the views. For example, the data may be grouped by a particular process or a phase within a migration project. Further, the demographically arranged views may provide for managing customer communications, for example, to manage customer availability during project phases. The arrangement of views may provide for managing of the data associated with the views to effect changes to characteristics of an entity, such as an organization.

Figure 1:
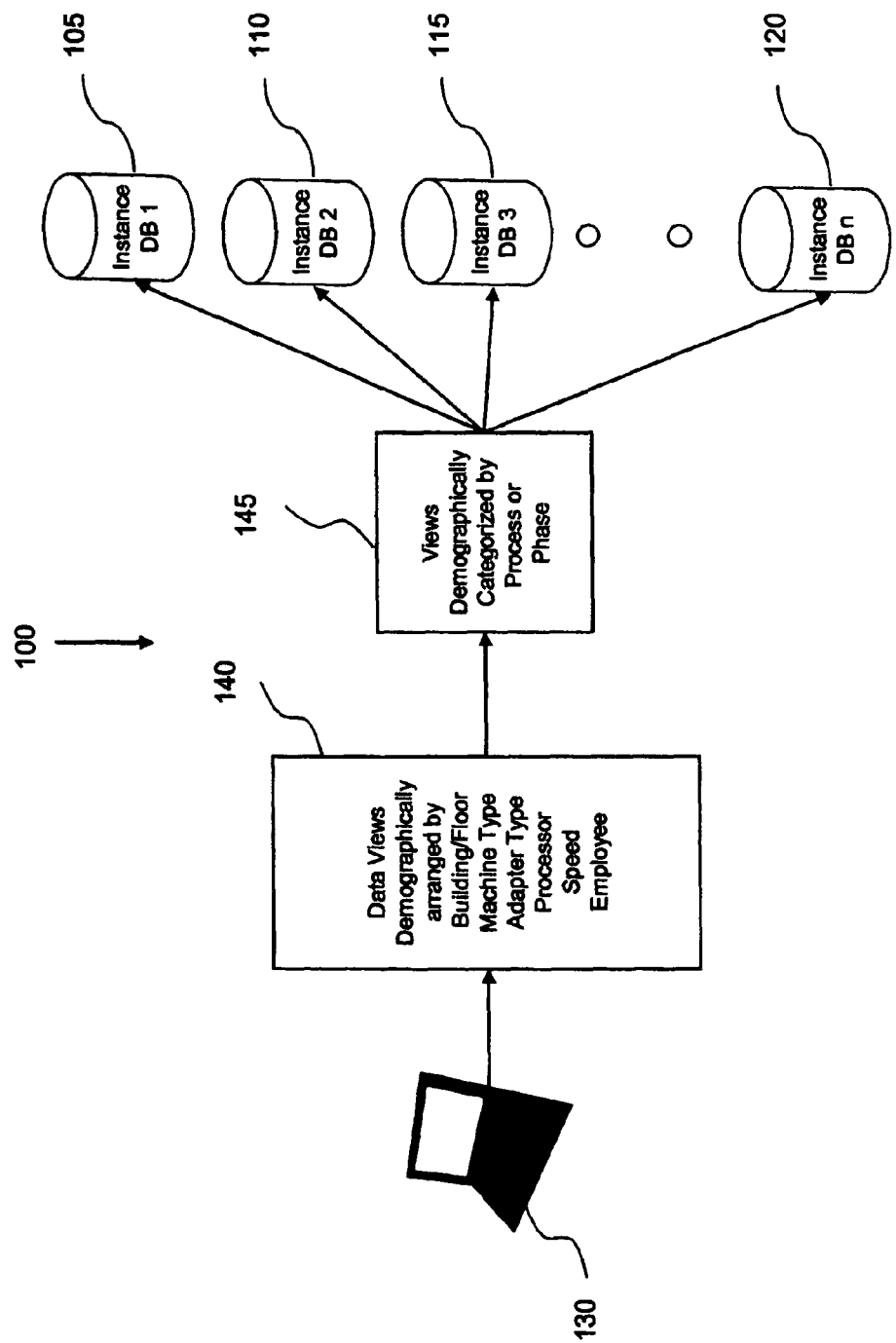
FIG. 1 is an illustrative overview of the organization of an embodiment of the invention.

FIG. 1 is an illustrative overview of the organization of an embodiment of the invention, generally denoted by reference numeral 100. Database instances 105-120 (DB1-DBn) represent similarly (typically identical) designed but physically separate instances (e.g., geographically different locations) and arranged in this relationship due to a business reason, security reason, or other logical reason.

In very large entities, employing only one database to manage and control a project of large scale may result in the database performance becoming overwhelmed; therefore several database instances may avoid this issue. Therefore, several database instances may be created, as necessary, to avoid performance bottlenecks or to segregate logically associated data (e.g., a division of a company may be contained in one database instance and another division of a company contained in another instance). A user may view the information associated with the database instance(s) 105-120 via an appropriate access machine, such as personal computer (PC) 130. The instances may also be created based on characterization of views to the databases, for example, by a process or phase of a process.

The data views of one or more database instances may be arranged to provide views demographically of an entity by any type of demographic ("demographic" generally refers herein to include any distinctive attribute, statistic, measurement, item, structure, process, or portions thereof) as denoted by reference numeral 140. For example, views may be organized so that information is categorized by building, floor in the building, by machine (e.g., computing equipment type), by network adaptor type, processor speeds, by employee, or any meaningfully identifiable characteristic to name a few. Further, the view may be demographically categorized by a process or by a phase within a project plan, as denoted by reference numeral 145.

Figure 2:
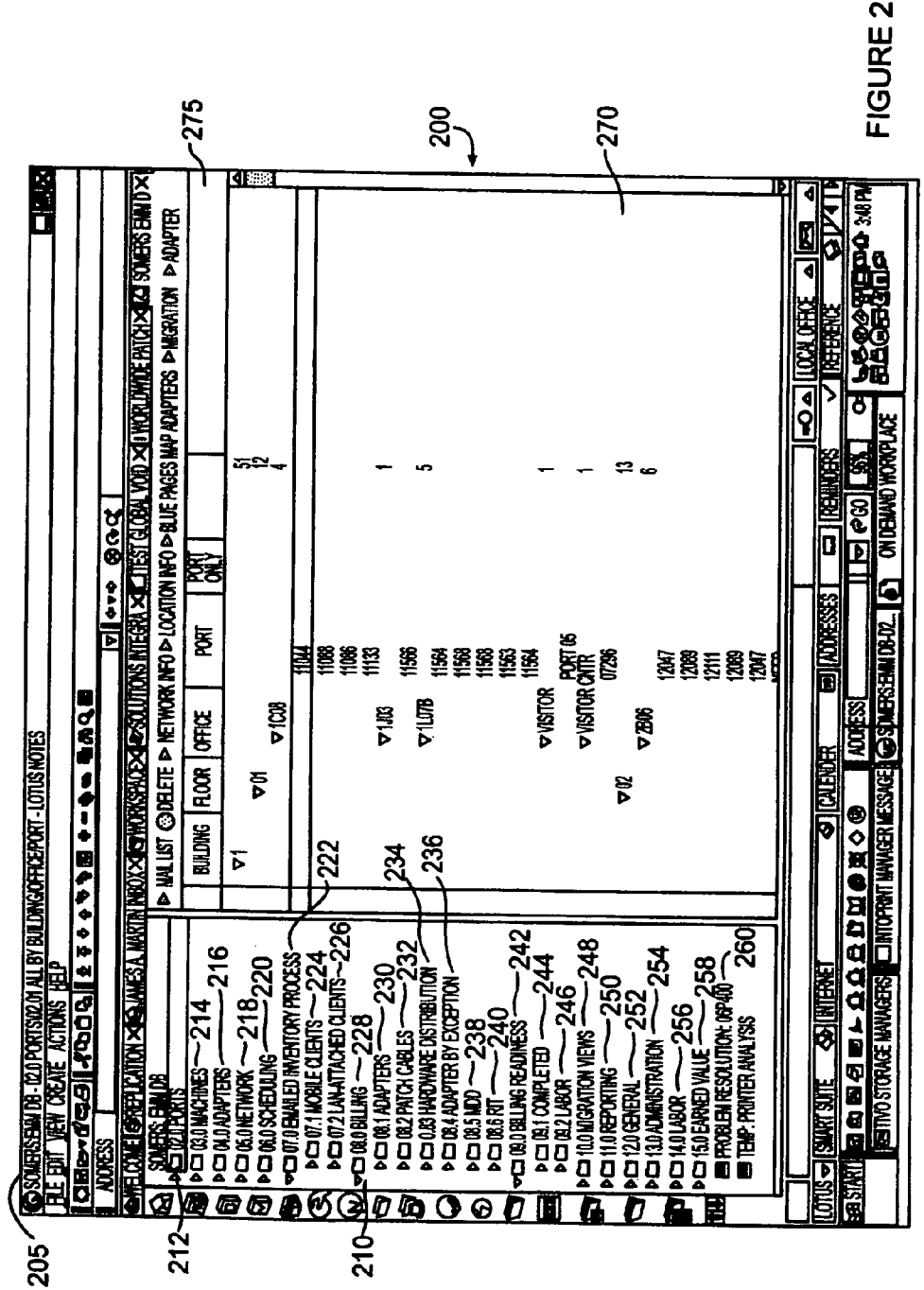
FIG. 2 is an embodiment of a graphical user interface (GUI) showing demographically organized views into associated database instance(s), according to the invention.

FIG. 2 is an embodiment of a graphical user interface (GUI) showing demographically organized views into associated database instance(s), generally denoted by reference numeral 200. The database name 205 (e.g., Somers database which may be a database instance for an entity or portion of an entity) identifies which database that has been selected and is currently being viewed, and may give the sort criteria such as building, office, port. The views of the Somers database illustratively reflect the project aspects for the Somers entity. The view navigator field 210 lists the defined demographic categories of views. The categories shown in the navigator field 210 include many categories and subcategories listed below. It should be understood that the instances (names) of these categories and subcategories are provided for illustrative purposes, and that the inventor is not limited to these specific nomenclatures. Accordingly, other nomenclature may also be used with the invention.

Ports 212: this view, when selected, reflects the types and quantities of wall ports by physical entity such as office.

Machines 214: this view, when selected, reflects the type of machines (e.g., computers, scanners, printers, or the like).

Network 218: this view, when selected, reflects the type of networks and technical characteristics associated with networks.

Scheduling 220: this view, when selected, may provide information on who has been migrated and when. This may be ordered, for example, by building, descending data order, by geographic arrangement or time.

eMailed Inventory Process 222: this view, when selected, provides information on emailed communications to migration participants. Two types of categories are included under view 222, including, for example, mobile clients 224 and local area network (LAN) attached clients 226. Mobile clients 224 may be those participants that typically work remotely and only occasionally are a part of a central enterprise network. LAN attached clients 226 may be those participants that are typically attached to the central LAN but have no IT staff to support their local network. This may reflect smaller offices that are remotely connected. The folders under this view may be ordered by ports, machines, adapters, scheduling, etc., in a similar manner to the content and order of the view navigator 210, itself.

Additional views may include, for example:

Billing 228: this view, when selected, reflects billing status and billing summary for each component or activity involved in the migration. For example, the subviews for these components or activities may reflect the breakdown and categorization of billing and may include such items as adaptors 230, patch cables 232, hardware distribution 234, adaptor by exception 236, MDO 238 (i.e., Multiple Device Offering, a type of splitter), and RIT 240 (i.e., a type of port connector, by a specific manufacturer). The subviews for billing may include any type of contributing cost basis, by way of illustration.

Billing Readiness 242: this view, when selected, captures by recordation the people who have been migrated. This view further includes Subview Completed 244 which captures the users or tasks that have been fully completed and are ready to be billed and/or closed out. Subview labor 246 indicates recorded labor against an entity (office, person, department, etc.) but has not been marked "completed."

Migration Views 248: this view, when selected, indicates progress on the migration and may also show activity not scheduled or unknown status due to an unforeseen issue.

Reporting 250: this view, when selected, shows status and counts of how many users or machines were migrated, by date, office, or other status and typically are results oriented.

General 252: this view, when selected, contains subviews that do not fit into any other view such as, for example, damaged material, tentative issues, or the like.

Administration 254: this view, when selected, typically shows rules, guidelines and/or preferred parts and components (e.g., adaptors, connectors, equipment, etc) that may be maintained by project administrators.

Labor 256: this view, when selected, provides for managing all labor information that may be feed back to other systems for tracking, accounting, and/or billing.

Earned Value 258: this view, when selected, provides for a specific type of report to gauge cost effectiveness as a whole. This may be used by decision makers as to overall value or efficiency of a migration project.

Problem Resolution 260: this view, when selected, provides for a general category of capturing general problems and status.

The viewing pane 270 reflects the contents of the view selected, in this example, when Ports 212 is selected. The viewing pane header 275 includes column headings for "Building," "Floor," "Office," "Port," and "Port Only". The information for the Ports 212 view is shown sorted in a hierarchical manner. The sort order shows Building 1 having Floor 01 and 02. Each Floor having Offices, i.e., 1c08, 1J03, 1107B, Visitor, and Visitor CNTR associated with Floor 01; and 12047, 12089, 1211, 12089, 12047, and NEED associated with Floor 02.

Ports associated with each Office, e.g., 1104, 11088, 11086, 11133 for Office 1C08; 11566 for Office 1J03, etc. are also shown. The port denoted by NEED shows that a new port is required in Office 2B06. The column denoted by "Port Only" is a tally of ports by hierarchical layer. For example, the total number of ports for Building 1 is shown to be 51. The sub-total for Floor 01 is 12, whereas, the sub-total for Floor 02 is 13. Sub-totals by office are also shown (e.g., 1L07B sub-total is 5).

Of course, the viewing pane of FIG. 2 is only an illustrative example. Accordingly, it should be recognized by those skilled in the art that the selection of other views will result in different viewing panes and ordering therein, which should be understood in the context of this disclosure.

Figure 3:
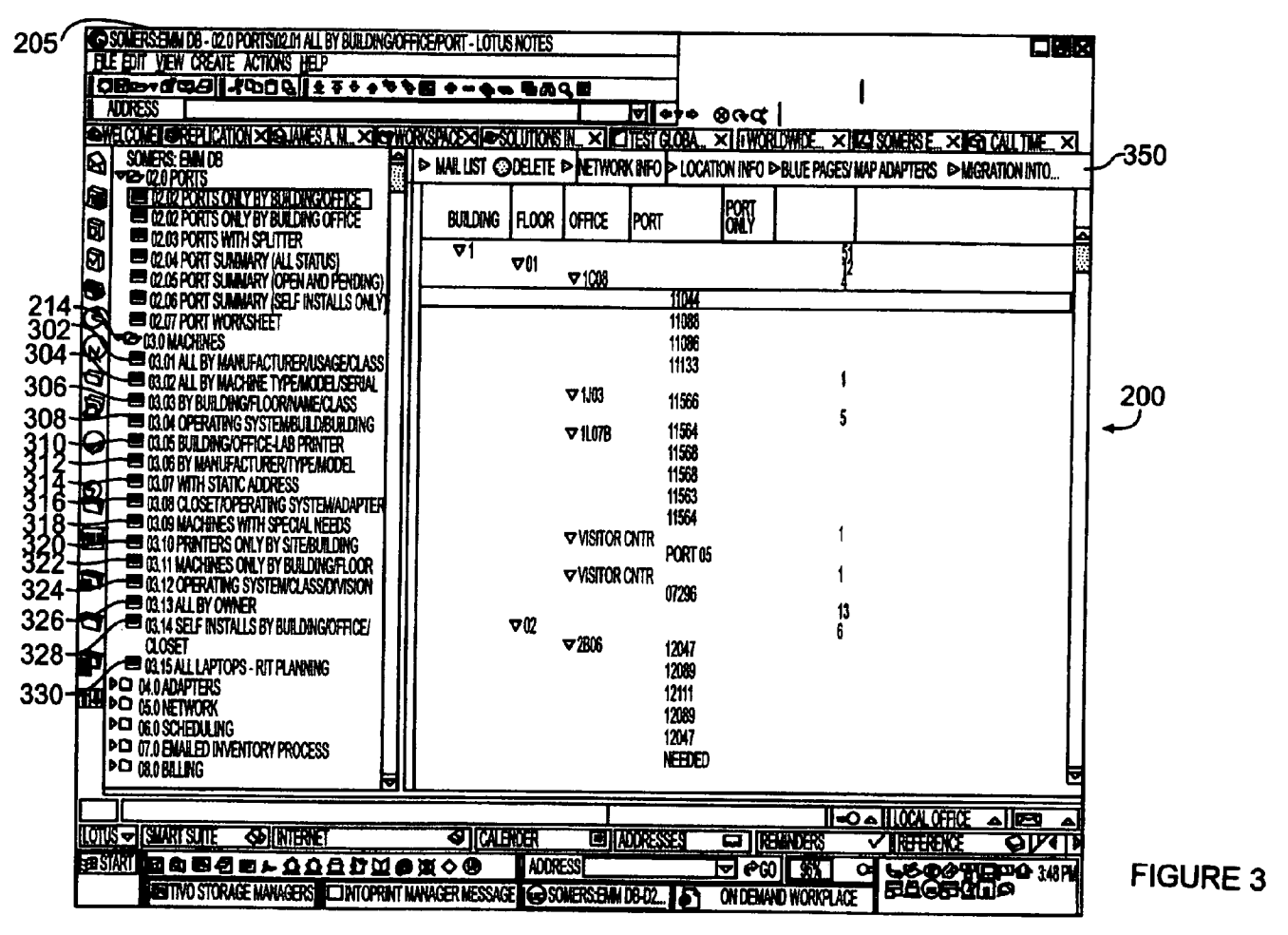

By way of example, FIG. 3 is an embodiment of a graphical user interface (GUI) showing demographically organized views. This GUI is similar to the embodiment of FIG. 2 but additionally shows the expansion of the Machines 214 view. The subviews of FIG. 3 are examples and one of ordinary skill in the art would recognize that many different types of demographic subviews may be created. The subviews, when selected, include All By Manufacturer/Usage/Class 302 which provides information (e.g., components and equipment) by manufacturer, by usage, or by class. Subview All by Machine Type/Model/Serial 304 provides information by machine type, model number and serial number. Subview By Building/Floor/Name/Class 306 provides information by building, floor, name and class. Class typically refers to a machine class, such as a laptop, desktop, lab workstation, or server, for example.

Subview Operating System/Build/Building 308 provides software related information by type of operating system, build levels (e.g., version of a standard workstation installation pre-load application or the like), and associated building. By Building/Office-Lab-Printer 310 provides information on printers by building, office and/or lab. Subview By Manufacturer/Type/Model 312 provides information related to equipment or components by manufacturer, type, and model. Subview With Static Address 314 provides information of equipment that have a static IP address assigned.

Closet/Operating System/Adapter 316 subview provides information by closet, type of operating system, and type of adapter. Subview Machines with Special Needs 318 provides information on equipment that requires special attention or needs. For example, equipment that requires conditioned power, air conditioning, or the like. Printers Only By Site/Building 320 subview provides information and data on printers by site and building. Machines Only By Building/Floor 320 subview provides information on machines only organized by building and floor.

Operating System/Class/Division 324 provides information on operating systems, class of operating systems, by division (i.e., part of a company or organization) of location. All By Owner 328 shows information organized by owner such as equipment, ports, machines, etc. All Laptops—RIT Planning 330 provides information on laptop computers and its connectivity requirements.

View Action Tool bar 350 provides for functional selections by a user. The View Action Tool bar 350 includes the selection "Mail List" that provides for creating a mail list for selected items targeting owners/users that are related to the selected items. A "Delete" function provides for deletion marking of entries, typically only certain people may have this right, perhaps by security level. "Network Info" provides an update function to update a document of the view with network parameters. "Location Info" provides a map of the physical locations of entities listed in the selected view. "Blue Pages/Map/Adapters" refreshes from a master directory, all adapters and associated information, as appropriate. "Migration Info" provides general information on migration status.

Figure 4:
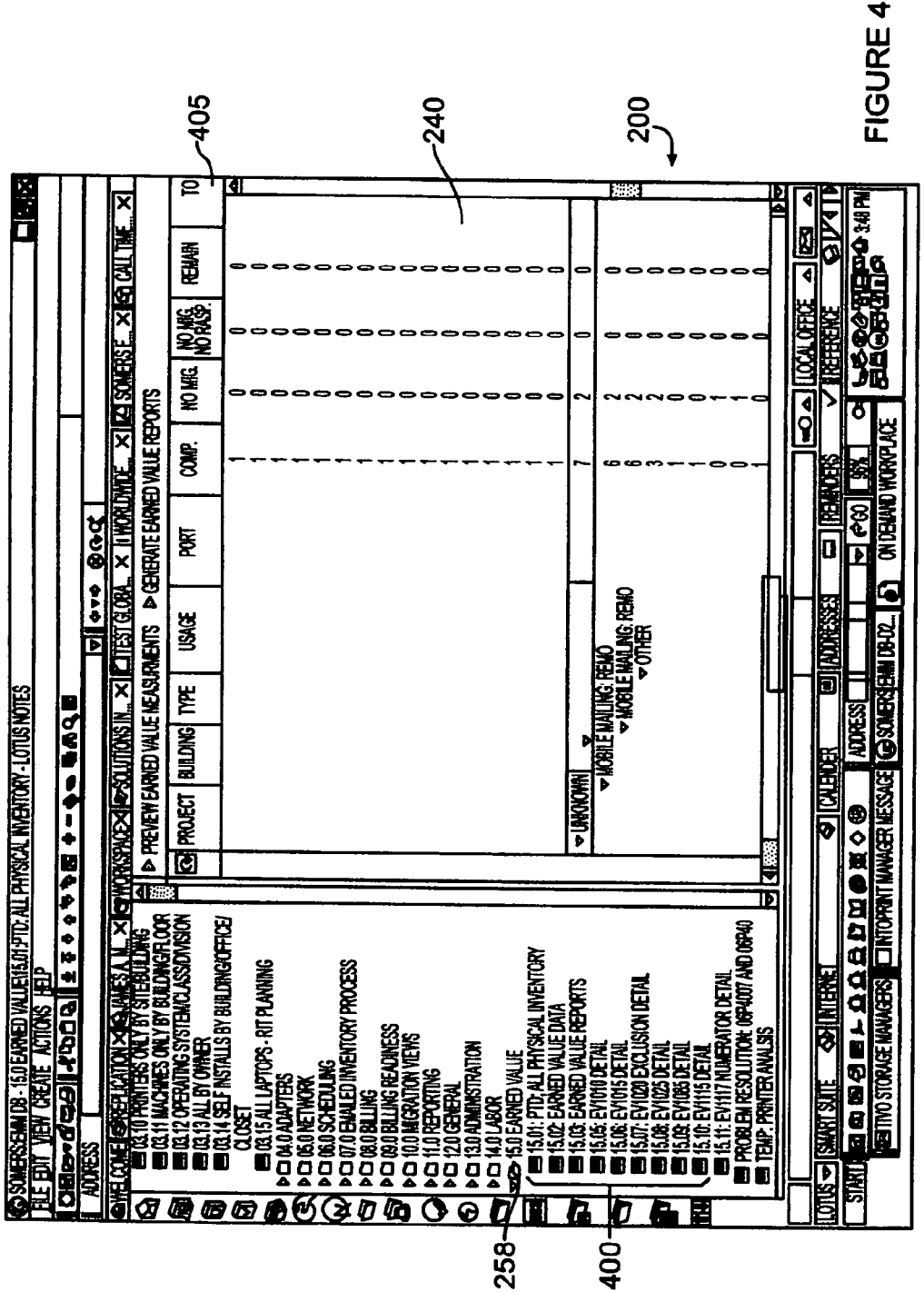
FIG. 4 is an embodiment of a graphical user interface (GUI) showing demographically organized views, according to the invention.

FIG. 4 is an embodiment of a graphical user interface (GUI) showing demographically organized views. FIG. 4 shows an expanded Earned Value 258 view for viewing subviews associated with earned value information as categorized by earned value subviews 400. The earned value categories capture savings or costs. The categories may be established by different parameters such as physical inventory.

The header 405 for the viewing pane 240 includes "Project" (in this example, an Ethernet migration project), "Building," "Type" (e.g., representing the type of migration such as "ports", "printers", or "other machines"), "Usage" (e.g., indicating the usage of a machine such as, for example, personal office workstation, a tool controller, or the like). Also included in the header 405 are "Comp" (e.g., representing a number of machines, ports, printers, etc., migrated so far), "No Mig." (i.e., number not requiring migration) "No Mig. No Resp." (not migrated due to no response to a migration request) and "Remain." (e.g., indicating the number of remaining machines, ports, etc. yet to be migrated).

Figure 5:
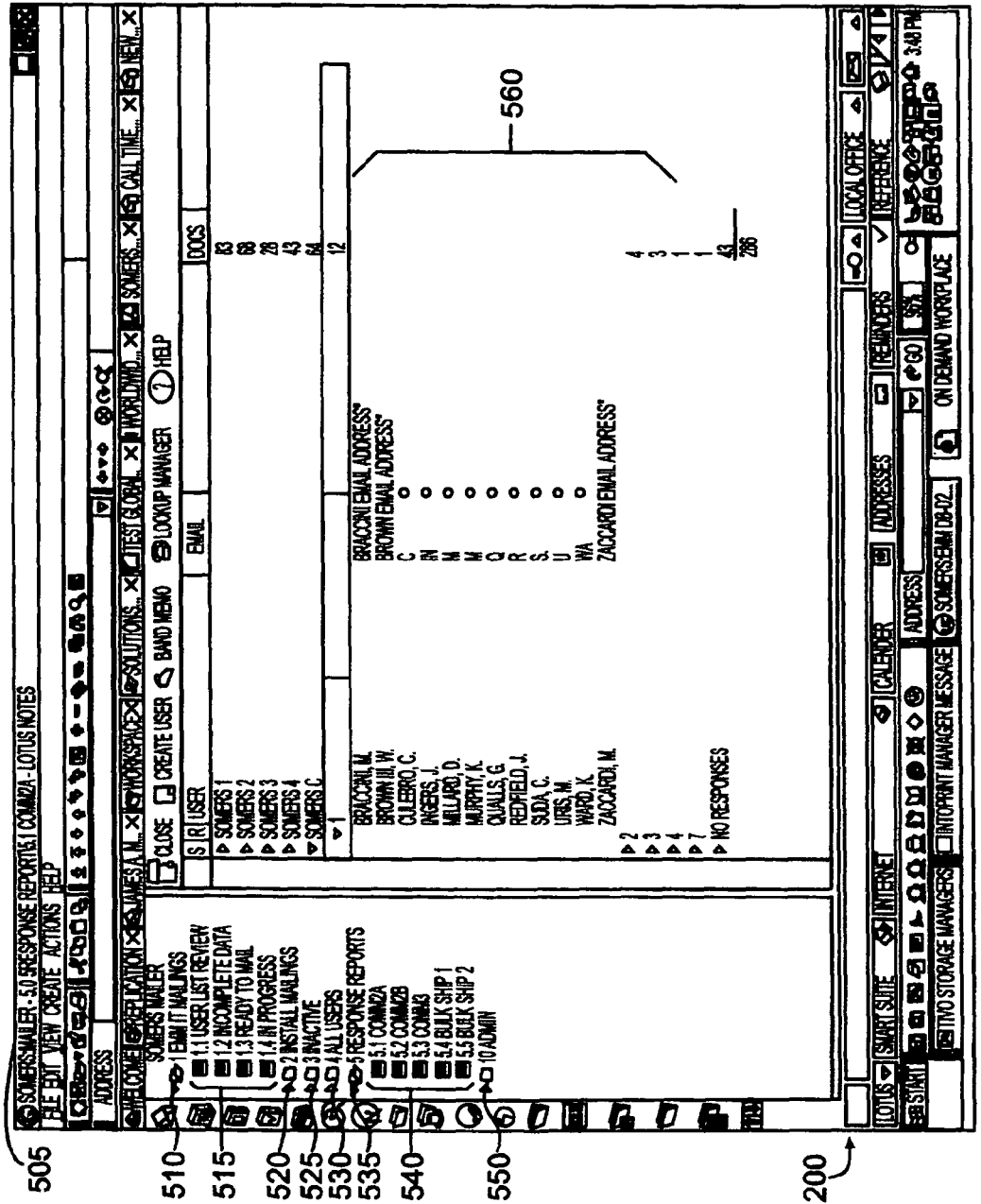
FIG. 5 is an embodiment of a graphical user interface (GUI) showing demographically organized views, according to the invention.

FIG. 5 is an embodiment of a graphical user interface (GUI) showing demographically organized views. The database name 505 shows that the Somers mailer database is being viewed.

The views into this database include EMM IT Mailings 510 which provide information as to IT mailings to users and may include subviews 510 into User List Reviews, Incomplete Data, Ready to Mail, and In Progress. Install Mailings 520 provides information on mailings related to scheduling clients for an adapter installation. Inactive 525 provides information on mailings no longer in progress (i.e., service has been completed/cancelled or mailings have been terminated due to lack of response from client). All Users 530 provides information on all users who have been communicated during the project. Response Reports 535 provides a view into the responses received from users with sub-categories 540 of responses. Communication summary 560 may include information associated with any people involved in the migration such as email addresses.

Figure 6:
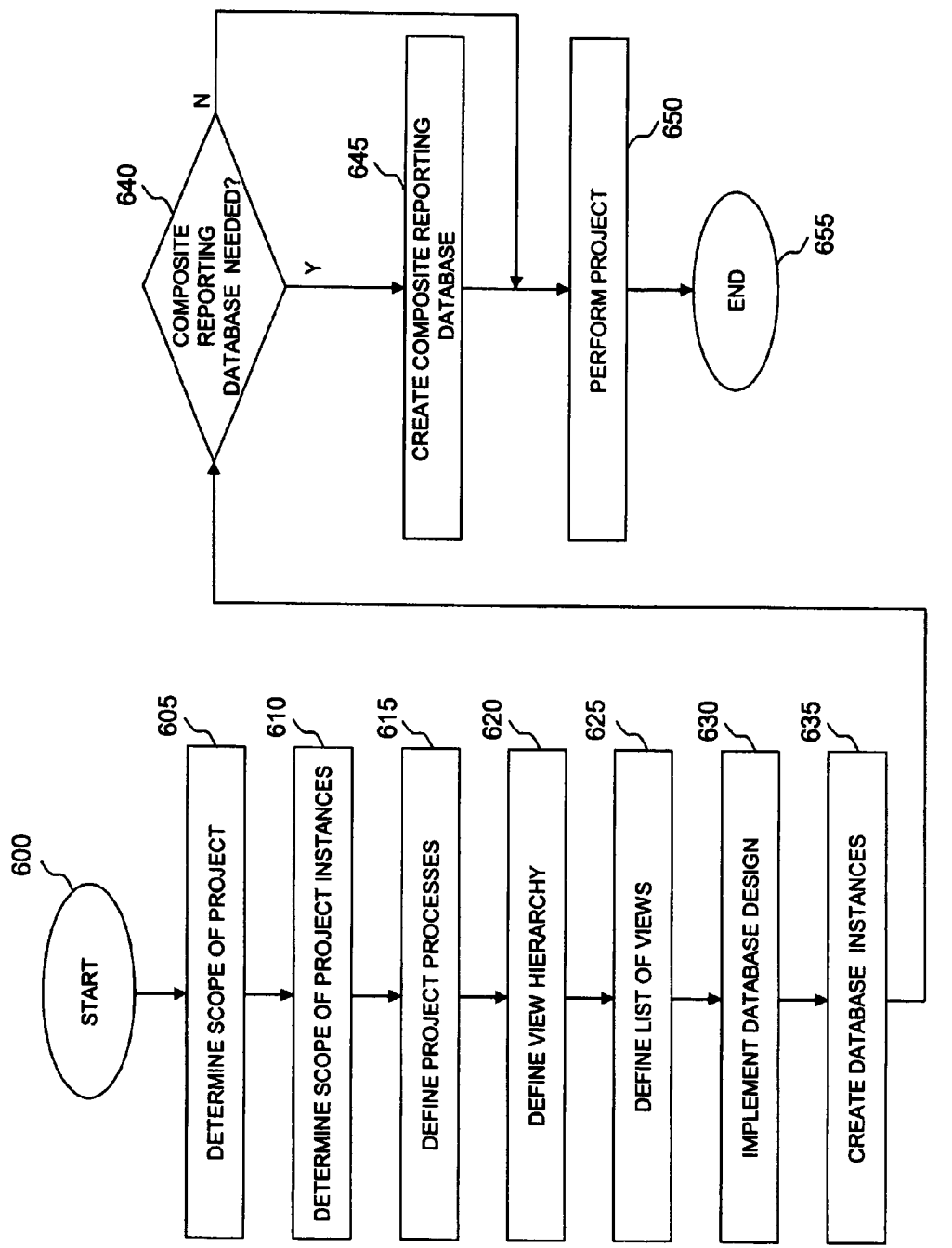
FIG. 6 is a flowchart of an embodiment showing steps of creating demographic organization and segmentation to manage large scale projects, according to the invention.

FIG. 6 is a flowchart of an embodiment showing steps of creating demographic organization and segmentation to manage large scale projects, beginning at step 600. FIG. 6 (and FIGS. 7-13) may equally represent a high-level block diagram of components of the invention implementing the steps thereof. The steps of FIG. 6 (and FIGS. 7-13) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Continuing with FIG. 6, at step 605, determination of the scope of a project (e.g., migration project) may be performed by assessing the candidate organizations, equipment, timeframe, locations, or the like, to be included in the project. At step 610, based on the determination of step 605, the scope of project instances may be determined so that aggregation of data into one or more databases may be accomplished that conform to security or performance requirements. At step 615, any project processes that are to be accomplished are defined. Processes may include, for example, planning, inventory management, client migration, earned value reporting, service billing, component billing, labor recording, wallport data recording, or the like. Any entity defined process may be included.

At step 620, a view hierarchy is defined reflective of the project and processes. At step 625, a list of views is defined. At step 630, a database design may be implemented that encompasses the scope of the project and view hierarchies and may employ any number of commonly available databases such as a relational database (or other type of suitable database) from various companies as IBM Corporation. At step 635, one or more database instances may be created to instantiate the databases for the project. At step 640, a determination is made whether a composite reporting database is required for capturing project migration history and information. If so, a composite reporting database is created at step 645 and processing continues at step 650. If, however, no reporting database is required, then processing continues at step 650. At step 650, the project is performed according to the scope of the project as defined by project processes and managed by using the databases instances and views. The may include accessing the views to add, delete, modify, update information within the views, as appropriate. At step 655, the process ends.

Figure 7:
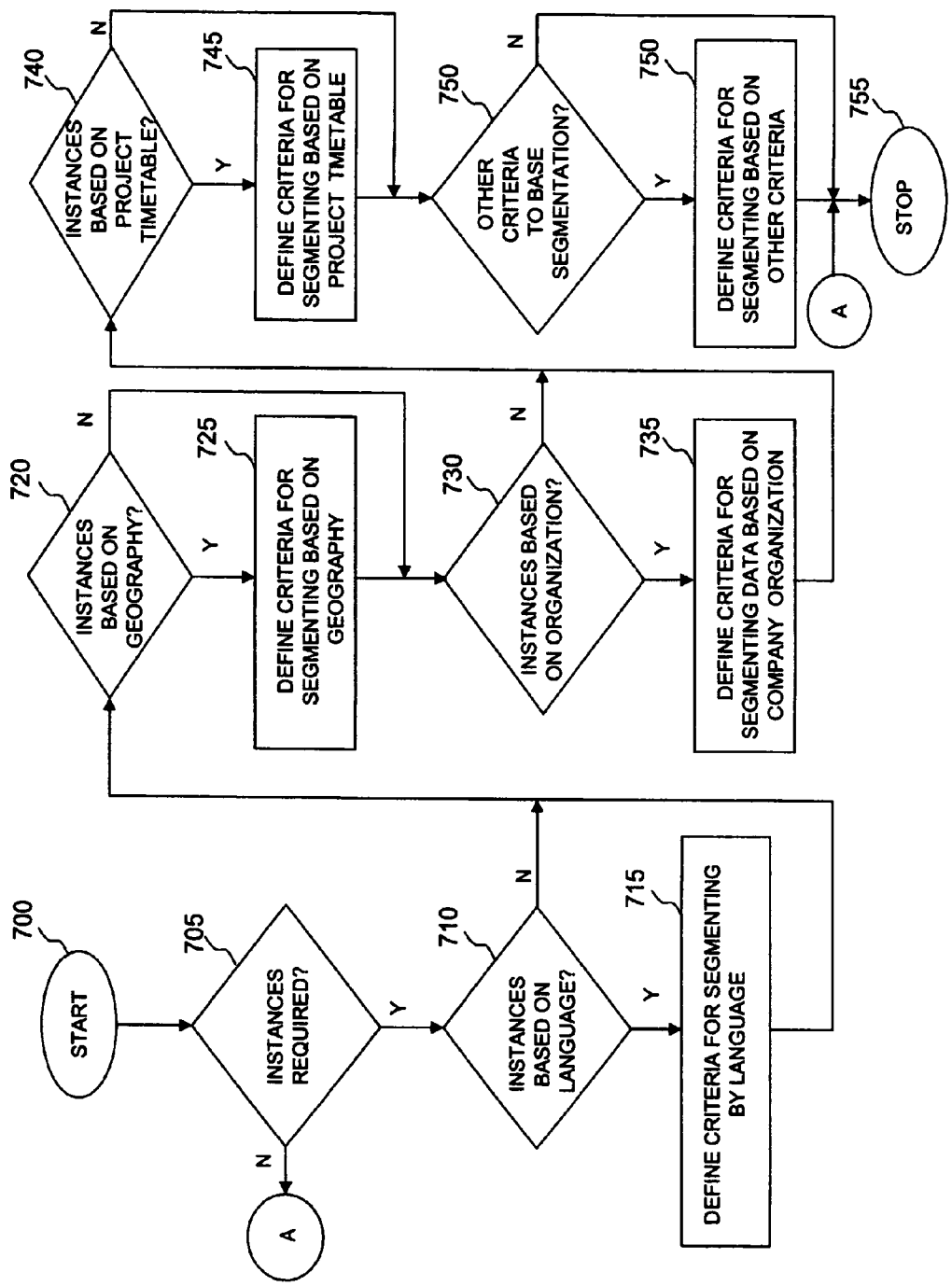
FIG. 7 is a flowchart of an embodiment showing steps of defining database instances, according to the invention.

FIG. 7 is a flowchart of an embodiment showing steps of defining database instances, beginning at step 700. At step 705, a determination is made whether any instances are required. If not, the process ends at step 755. If so, then at step 710, a determination is made whether any instance(s) is to be based on a national language in addition to, or in lieu of English. If not, processing continues at step 720. If so, then criteria are defined for segmenting project information and/or instances by language, as appropriate.

At step 720, a determination is made whether database instances are to be established based on geographic considerations. If not, processing continues at step 730. If so, at step 725, the criteria for segmenting the project information based on geography requirements are defined such as identifying physical and technical parameters for geographic locations. At step 730, a determination is made whether the database instances may be established according to organizational entity basis. For example, different divisions of a corporation or governmental body may warrant segregated instances of a database. If not, continue with step 740, else, at step 735, the criteria for segmenting data based on company/entity organization is defined. This may be based on, for example, physical, technical, internal organizational structure parameters.

At step 740, a determination is made based on the project time table. For example, the project may be logically partitioned into instances based on when events and/or physical parameters become relevant. For example, this may occur if large amounts of new buildings, offices, or technologies are involved and span different time periods. If not, the flow continues at step 750. Otherwise, at step 745, the criteria for segmenting based on the project timetable is defined. At step 750, a determination is made whether any other criteria is necessary to base segmentation of project data. If not, the process ends at step 755. Otherwise if so, then the criteria are defined for segmenting based on the other criteria. The process ends at step 755.

Figure 8:
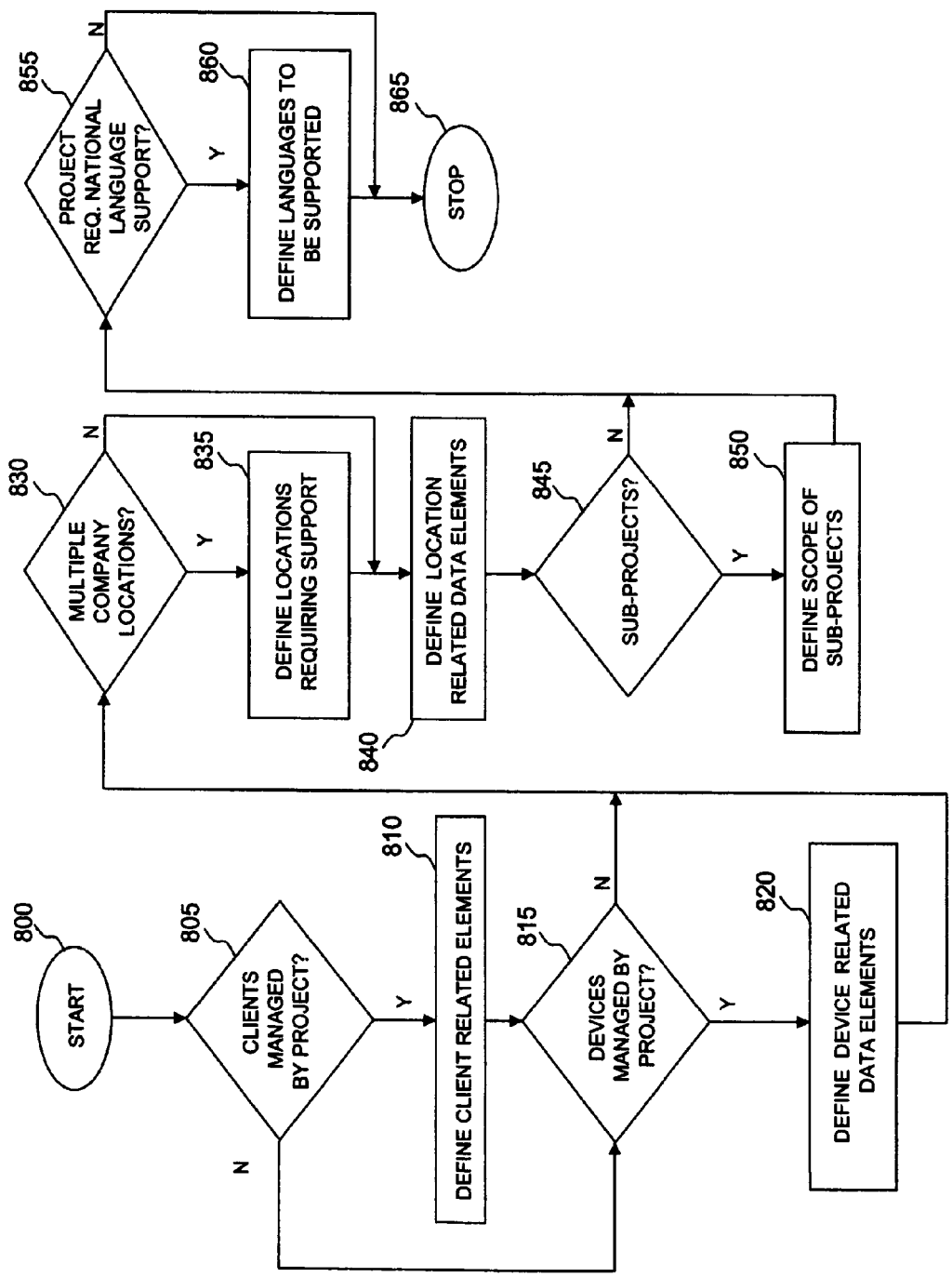
FIG. 8 is a flowchart of an embodiment showing steps of defining various aspects of a project, according to the invention.

FIG. 8 is a flowchart of an embodiment showing steps of defining various aspects of a project, beginning at step 800. At step 805, a determination is made whether clients are to be managed by the project. If not, the flow continues at step 815. Otherwise, at step 810, client related matters and requirements are defined. At step 815, a determination is made whether any devices are to be managed by the project. If not, the flow continues at step 830. Otherwise, if so, then device related data elements are defined and characterized.

At step 830, a determination is made whether multiple company locations are to be managed by the project. If not, then the flow continues at step 840. Otherwise, at step 835, the multiple locations are defined that require support by the project. At step 840, location specific related data elements are defined that characterize the location and infrastructure. At step 845, a determination is made whether any sub-projects are to be managed by the project. If not, the flow continues at step 855. Otherwise, at step 850, the scope of any sub-projects is defined. At step 855, a check is made whether any project or sub-project requires national language support. If not, the process ends at step 865. Otherwise, at step 860, the languages to be supported are defined for the project or sub-projects. The process ends at step 865.

Figure 9:
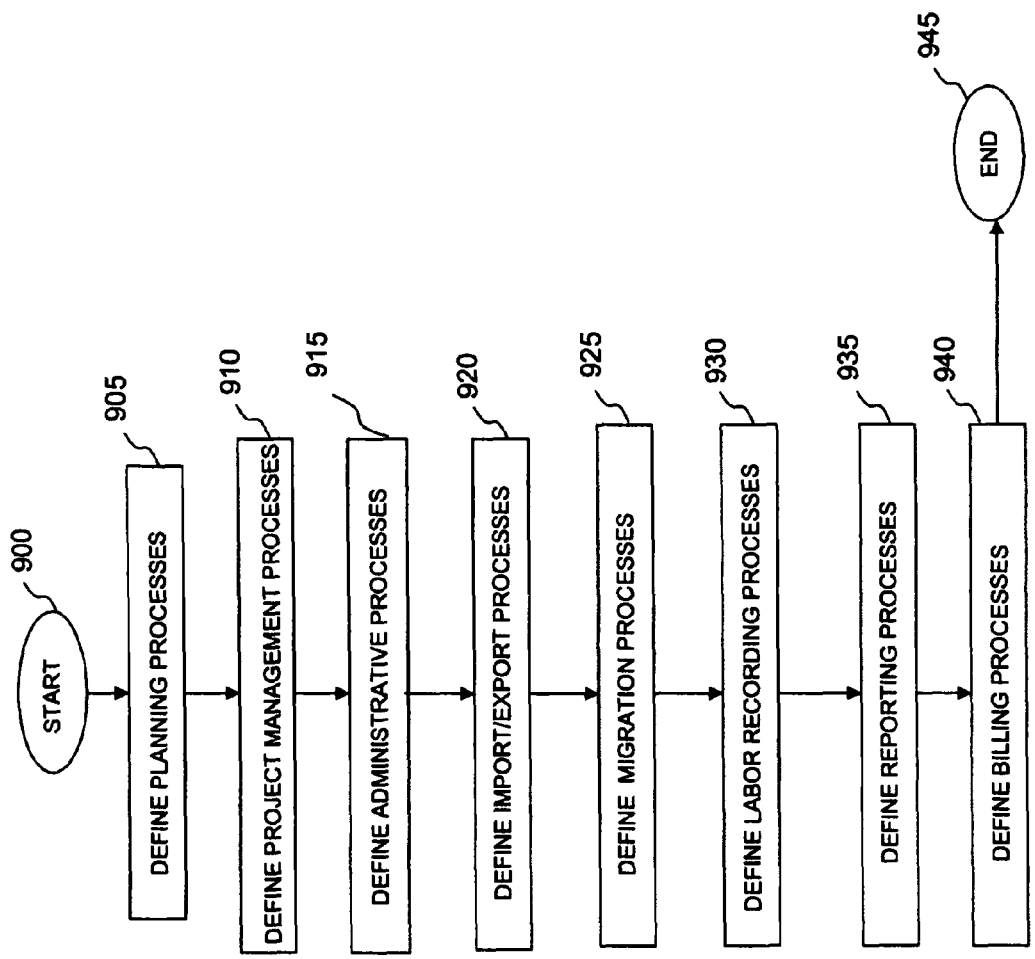
FIG. 9 is a flowchart of an embodiment showing steps of defining various processes of a project, according to the invention.

FIG. 9 is a flowchart of an embodiment showing steps of defining various processes of a project, beginning at step 900. At step 905, any planning processes for guiding and managing the creation of project processes are defined. At step 910, any project management processes are defined. At step 915, any administrative processes are defined. At step 920, any import/export processes are defined for conveying information. Import/export processes may include those processes which require importing information from another system such as an employee directory system, asset management system, workstation inventory system, etc. Exporting processes may include sending information to another system such as a corporate billing system, project management system, labor tracking system, or the like. These examples of import/export processes are illustrative and are not meant to be exhaustive.

At step 925, any migration processes are defined. At step 930, any labor recording processes are defined. At step 935, any reporting processes are defined. At step 940, any billing processes are defined. The process ends at step 945.

Figure 10:
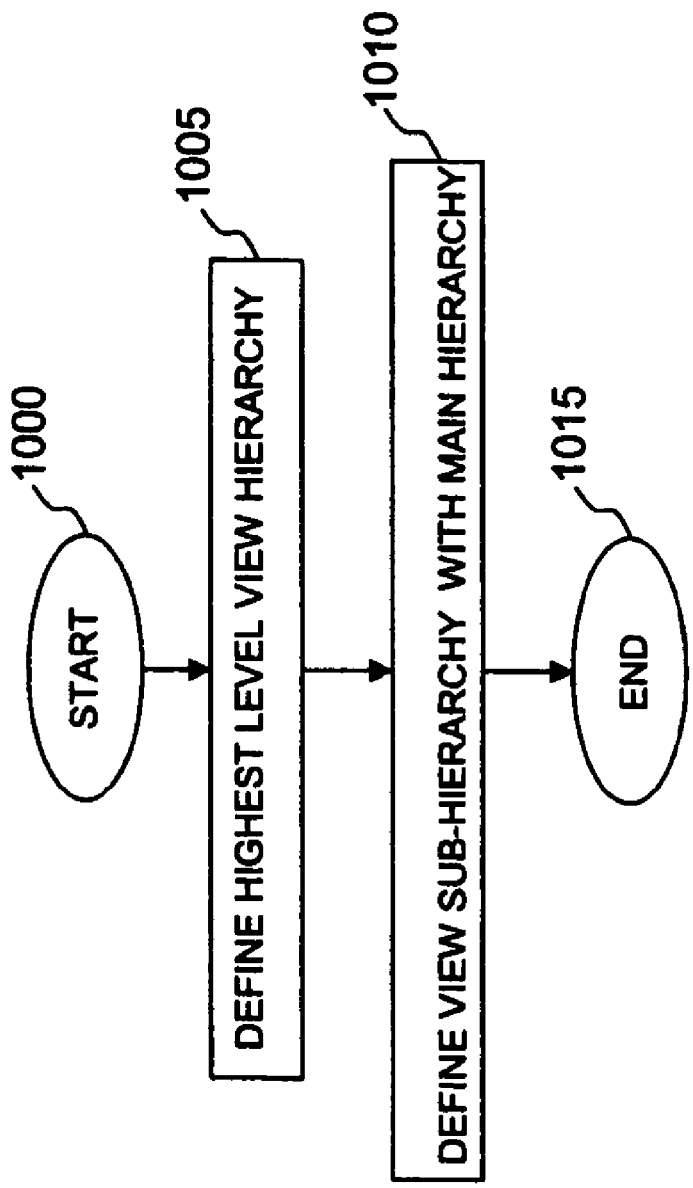
FIG. 10 is a flowchart of an embodiment showing steps of defining view hierarchies of a project, according to the invention.

FIG. 10 is a flowchart of an embodiment showing steps of defining view hierarchies of a project, beginning at step 1000. At step 1005, the highest level view hierarchy is defined. At step 1010, any view sub-hierarchy is defined within main hierarchy. The process ends at step 1015.

Figure 11:
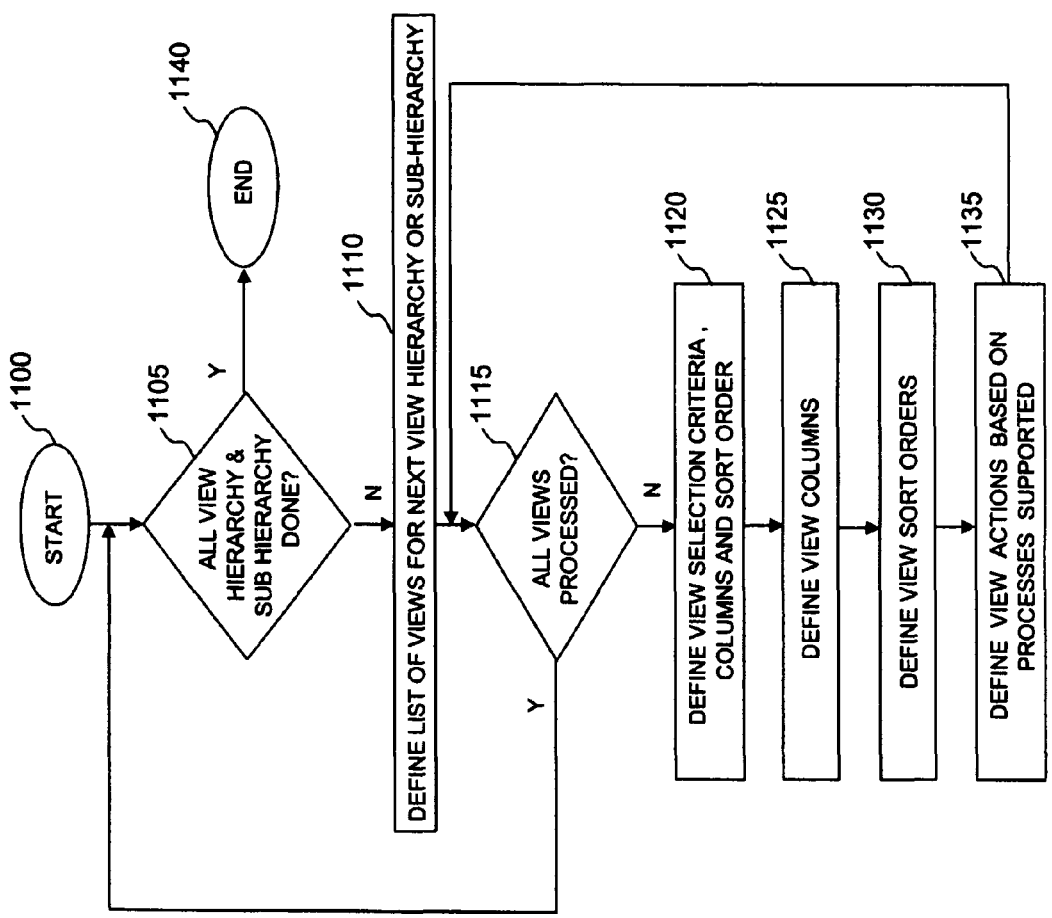
FIG. 11 is a flowchart of an embodiment showing steps of defining views of a project, according to the invention.

FIG. 11 is a flowchart of an embodiment showing steps of defining views of a project, beginning at step 1100. At step 1105, a check is made whether all view hierarchy and sub-hierarchy have all the views defined. If so, then the process ends at step 1140. At step 1100, a list of views required for the next (or first view, as appropriate) hierarchy or sub-hierarchy is created. At step 1115, the created list may be checked to see if all views have been processed and/or defined.

At step 1120, for the next view (or first, as appropriate) the view selection criteria are defined. At step 1125, the view columns are defined. At step 1130 the view sort order is defined. At step 1135, view actions (i.e., functions that may be performed by an end user) based on processes supported are defined. For example, this may include defining action buttons for clicking which may facilitate marking a client as having completed migration, exporting labor data, updating directory data, updating networking information, or previewing earned value reports, or the like. Processing continues with the next view at step 1115.

Figure 12:
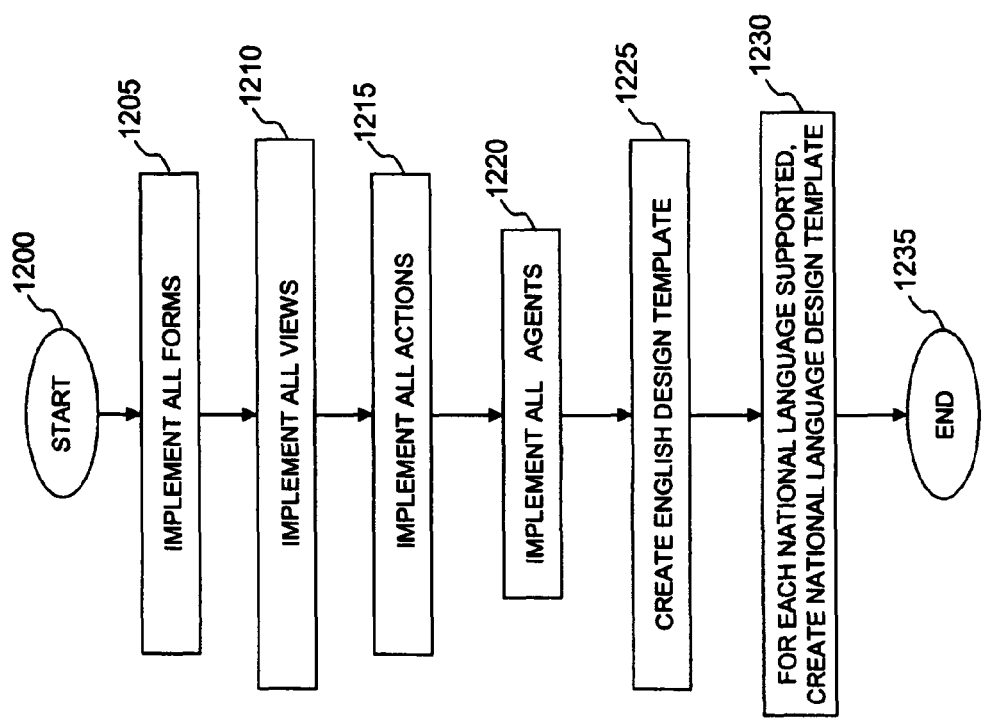
FIG. 12 is a flowchart of an embodiment showing steps of implementing the various defined processes and parts of a view, according to the invention.

FIG. 12 is a flowchart of an embodiment showing steps of implementing the various defined processes and parts of a view, beginning at step 1200. At step 1205, all forms are implemented. Forms typically include database design elements that contain database fields which are used to create database documents or records. At step 1210, all views are implemented according to definition. At step 1215, all actions associated with the project are implemented. At step 1220, all agents are implemented. Agents (data processing software programs) may be called by the end user via the view actions. The agents may also be scheduled to run automatically in the background. At step 1225, English templates are implemented. At step 1230, for each national language supported and create national language design template. The process ends at step 1235.

Figure 13:
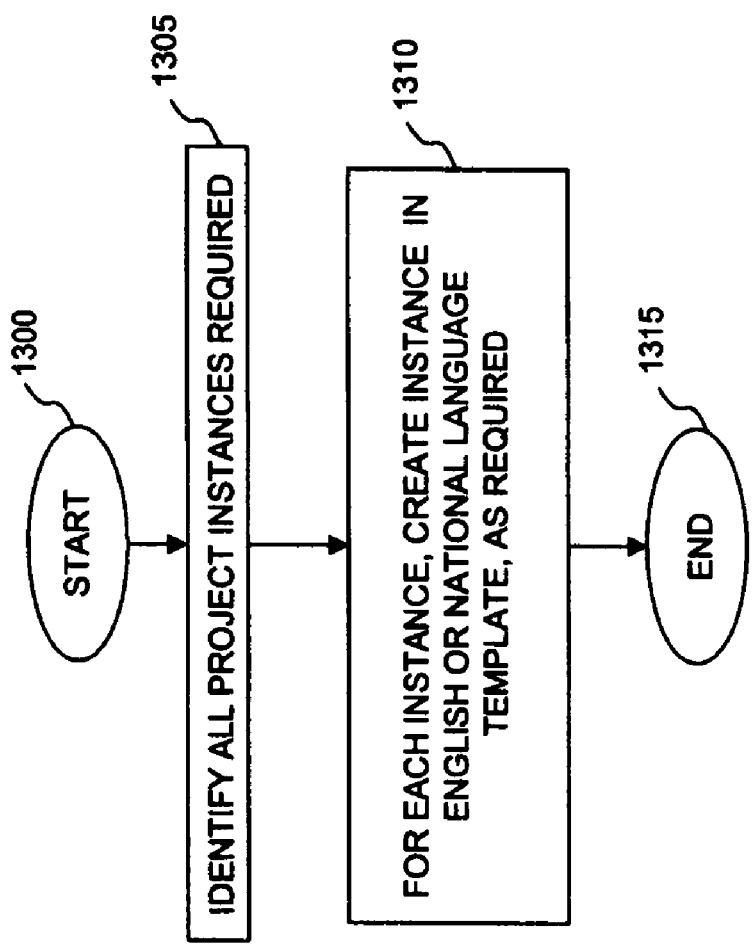
FIG. 13 is a flowchart of an embodiment showing steps of implementing project instances.

FIG. 13 is a flowchart of an embodiment showing steps of implementing project instances, beginning at step 1300. At step 1305, identify all project instances required to according to plan. At step 1310, for each instance identified, create the instance in the appropriate language as required. At step 1315, the process ends.

As thus described, the invention is described in terms of migrating, on a very large scale, a corporate entity from one technological paradigm (e.g., versions of software, application types, network technologies, interoperability, or the like) to another technical paradigm. The example also involves relocating personnel from one or more locations to other locations (typically, different buildings, offices or work areas). In one embodiment, the invention provides for capturing technological characteristics or parameters associated or identifiable with personnel, office parameters, equipment versions and compatibility, time frames, processes, costs, or communication to affected parties, and provides for tracking and managing the migration by these characteristics. In this way, a large scale migration may be closely tracked and managed so that costs are reduced and communication between migration participants may be improved, rendering greater accuracy in the overall migration.

While the invention has been described in terms of embodiments, those skilled in the art will recognize that the invention can be practiced with modifications and in the spirit and scope of the appended claims.

What is claimed is:

1. A system implemented in a computer infrastructure having computer executable code tangibly embodied on a computer readable storage medium to segment an organization migration project, comprising:
    a means for arranging organization migration project data views demographically to reflect one or more characteristics of an entity organization;
    a means for instantiating the organization migration project data views demographically by implementing forms that include database design elements that contain database fields, which are used to create database documents or records based on a list of the organization migration project data views for each level of a hierarchy; and
    a means for accessing the organization migration project data views to add, modify or view demographically arranged organization migration project data reflective of one or more characteristics of the organization to manage the organization migration project by managing the demographically arranged organization migration project data to effect a change in the one more characteristics of the organization,
    wherein the organization migration project is a physical migration of existing offices and personnel of the entity organization.

2. The system of claim 1, wherein the organization migration project data views are arranged to reflect at least any one of the organization's organizational structure, physical components, technical components, timetable, geography, communications, one or more processes and language.

3. The system of claim 2, wherein the organization migration project data views are arranged to include the one or more processes and include actions associated with the one or more processes.

4. The system of claim 1, further comprising a means for defining the hierarchy of the organization migration project data views and defining the list of the organization migration project data views.

5. The system of claim 4, comprising a means for defining and implementing a view selection criterion, columns, sort orders, and view actions for any processes supported by each organization migration project data view in the list.

6. The system of claim 1, further comprising a means for creating one or more database instances of the organization migration project data views wherein the one or more database instances are two or more database instances identical in design but differing in configuration information and actual data residing therein based on the characteristics, or wherein the two or more database instances are geographically independent.

7. The system of claim 6, wherein the means for creating one or more database instances includes implementing forms, views, actions and agents.

8. A computer program product comprising a computer readable storage medium having readable program code embodied in the medium, the computer program product includes at least one component to:
    determine a scope of an organization migration project for an organization;
    determine a scope of at least one project instance determined to be within the scope of the organization migration project such that data relevant to the at least one project instance can be aggregated into one or more database instances;
    define at least one process of the organization migration project;
    provide a hierarchy reflective of the scope of the at least one project instance and the at least one process;
    define a list of organization migration project data views for each level of the hierarchy;
    instantiate the organization migration project data views demographically by implementing forms that include database design elements that contain database fields, which are used to create database documents or records based on the at least one defined process and the list of organization migration project data views for each level of the hierarchy; and
    access the organization migration project data views to add, modify or view demographically arranged organization migration project data reflective of one or more characteristics of the organization to manage the organization migration project by managing the demographically arranged organization migration project data to effect a change in the one or more characteristics of the organization,
    wherein the organization migration project is a physical migration of existing offices and personnel of the organization.

9. A computer system for demographic organization and segregation of information, the system comprising:
- a CPU, a computer readable memory and a computer readable storage media;
- at least one database instance;
- first program instructions to define a scope of an organization migration project for an organization by assessing a plurality of factors to determine at least one project instance;
- second program instructions to define a scope of the at least one project instance such that data pertaining to the project is aggregated;
- third program instructions to define at least one project process;
- fourth program instructions to define at least one view hierarchy for the at least one project instance in order to organize the aggregated data, and at least one view hierarchy for the at least one project process in order to organize the at least one project process;
- fifth program instructions to implement a database design on the at least one database instance that encompasses the scope of the project by instantiating the at least one view hierarchy for the at least one project instance and the at least one view hierarchy for the at least one project process; and
- sixth program instructions to add, delete, modify and update the data, the at least one view hierarchy for the at least one project instance, and the at least one view hierarchy for the at least one project process,
- wherein the organization migration project is a physical migration of existing offices and personnel of the organization; and
- wherein the first through sixth program instructions are stored on the computer readable storage media for execution by the CPU via the computer readable memory.

10. The system of claim 9, wherein the at least one database instance is a plurality of database instances and the plurality of database instances are similar in design and physically separated.

11. The system of claim 10, further comprising seventh program instructions to define the plurality of database instances comprising:
- defining the database instances based on at least one of: language, geography, organization and timetable; and
- defining a criteria for segmenting the database instances based on the at least one of: language, geography, organization and timetable.

12. The system of claim 11, further comprising eighth program instructions to define aspects being managed by the project comprising:
- defining the aspects based on at least one of: clients, devices, company locations and sub-projects that are to be managed by the project;
- determining whether the project requires language support; and
- defining the data that characterize the at least one of: clients, devices, company locations and sub-projects.

13. The system of claim 12, wherein defining the at least one process of the project comprises defining at least one of: planning processes, project management processes, administrative processes, import/export processes, organization migration processes, labor recording processes and billing processes.

14. The system of claim 13, wherein defining the at least one view hierarchy for the at least one project instance and the at least one view hierarchy for the at least one project process comprises:
- defining a highest level view hierarchy and defining at least one sub-hierarchy within the highest level view hierarchy for the at least one project instance; and
- defining a highest level view hierarchy and defining at least one sub-hierarchy within the highest level view hierarchy for the at least one project process.

15. The system of claim 14, further comprising ninth program instructions to define views of the project comprising:
- selecting the highest level view hierarchy for the at least one project instance and defining a view based on at least one of: selection criteria, view columns, sort order and action buttons;
- selecting the at least one sub-hierarchy for the at least one project instance and defining a view based on at least one of: selection criteria, view columns, sort order and action buttons;
- selecting the highest level view hierarchy for the at least one project process and defining a view based on at least one of: selection criteria, view columns, sort order and action buttons; and
- selecting the at least one sub-hierarchy for the at least one project process and defining a view based on at least one of: selection criteria, view columns, sort order and action buttons.

16. The system of claim 15, wherein implementing the database design comprises implementing:
- forms that include database design elements that contain database fields filled with the data, which are used to create database documents or records;
- views for the highest level view hierarchy and the at least one sub-hierarchy for the at least one project instance and for the highest level view hierarchy and the at least one sub-hierarchy for the at least one project process;
- data processing software programs; and
- language templates.

17. The system of claim 16, further comprising eleventh program instructions to implement the at least one project instance comprising:
- identifying the at least one project instance; and
- creating the identified at least one project instance based on an appropriate language template.

18. The system of claim 17, wherein the plurality of factors assessed for defining the scope of the organization migration project of the entity include candidate organizations of the entity to be migrated, equipment involved in the organization migration, time-frame of the organization migration, and locations involved in the organization migration.

19. The system of claim 18, wherein the at least one view hierarchy for the at least one project instance comprises:
- a port view that indicates types and quantities of wall ports by office of the organization;
- a machine view that indicates types of machines available;
- a network view that indicates types of networks and technical characteristics associated with the networks;
- a scheduling view that provides information on people who have been migrated and when;
- a billing view that reflects billing status and a billing summary for each component or activity involved in the organization migration;
- a billing readiness view that reflects people moved and tasks fully completed;
- an organization migration view that indicates progress on the organization migration; and
- a reporting view that indicates how many users or machines were migrated, by date, office, or other status.

* * * * *